May 6, 1958 M. C. HUNT 2,833,604
PISTON RING ASSEMBLY
Filed March 3, 1955
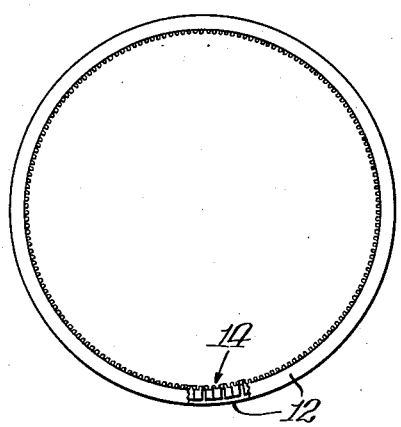
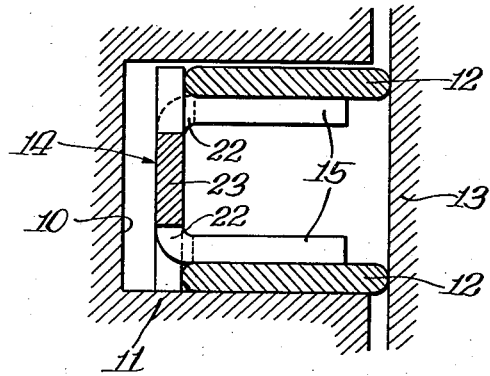
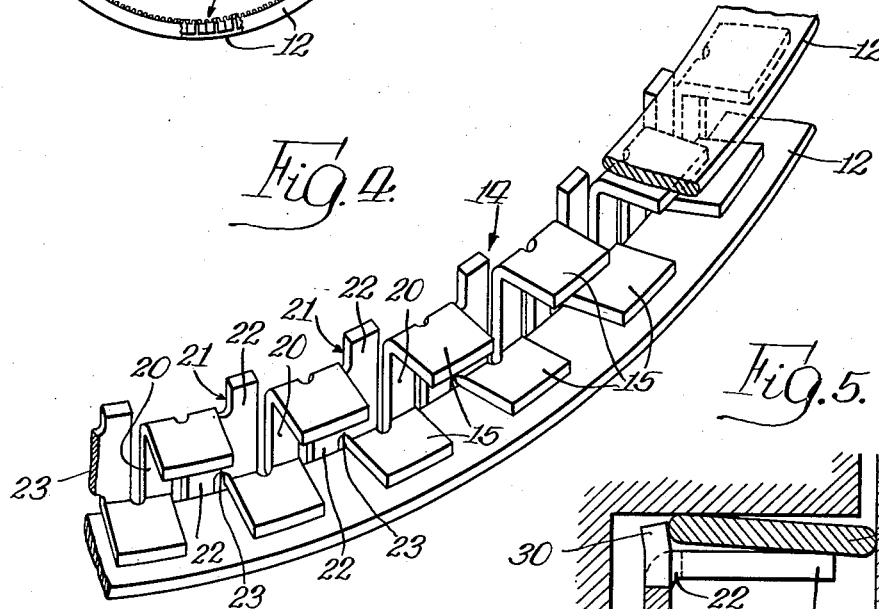
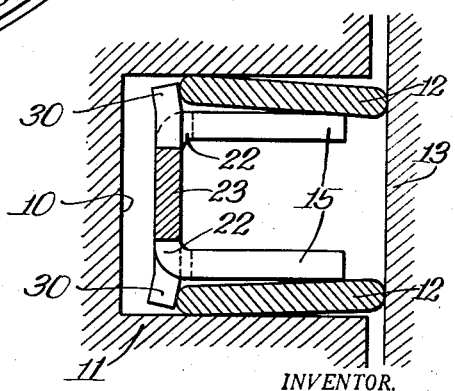
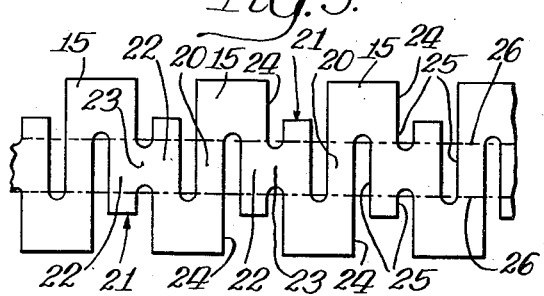
INVENTOR.
Myron C. Hunt,
BY
Davis, Lindsey, Hibben & Noyes
Attys.

United States Patent Office 2,833,604
Patented May 6, 1958

2,833,604
PISTON RING ASSEMBLY

Myron C. Hunt, Richmond, Ind., assignor to Perfect Circle Corporation, Hagerstown, Ind., a corporation of Indiana Application March 3, 1955, Serial No. 491,903

17 Claims. (Cl. 309—43)

The invention relates generally to piston rings and more particularly to a piston ring assembly including one or more rails.

The general object of this invention is to provide a piston ring assembly having a novel combined expanding and positioning means for one or more rails, which means is circumferentially expansible so that it does not have to engage the bottom of the groove in the piston, which is of inexpensive sheet metal construction, and which effectively holds the rail or rails in engagement with the cylinder wall.

Another object is to provide a piston ring assembly having a novel combined expanding and positioning means for one or more rails, said means exerting a force on the rail or rails in such a manner that they are forced both outwardly to effect a seal with the cylinder wall and axially to effect a seal with the side of the groove.

Other objects and advantages will become apparent from the following description taken in connection with the accompanying drawing, in which:

Fig. 1 is a plan view of a piston ring assembly embodying the features of the invention;

Fig. 2 is an enlarged radial sectional view of the ring assembly shown in Fig. 1 and illustrating the assembly in position in a groove within a piston and in a cylinder;

Fig. 3 is a fragmentary view of a strip of material from which part of the ring assembly is made;

Fig. 4 is a fragmentary perspective view of the ring assembly; and

Fig. 5 is a view similar to Fig. 2 but showing a modified form of construction.

The piston ring assembly herein disclosed comprises generally one or more cylinder-engaging rails, and a combined expanding and positioning means for holding the rail at the side of the groove and for expanding it radially outward. In the case where two such rails are employed, the combined expanding and positioning means holds the rails in axially spaced relation at the respective sides of the groove. The combined expanding and positioning means is of the circumferentially expansible type and comprises generally two rows of segments adapted to hold the rails at the sides of the groove, and a web structure providing for circumferential expansion and connecting the segments in one row with those in the other row. The web structure also includes arms which extend axially in opposite directions beyond the two rows of segments to engage the inner peripheries of the rails and force them outwardly. In the form shown in Fig. 5, these arms also cause the rails to dish so that their inner peripheral portions engage the adjacent sides of the groove to effect a seal therewith.

In Fig. 2 of the drawing, I have shown a ring assembly embodying the features of the invention and mounted in a groove 10 formed in a piston 11, the ring assembly having a pair of rails 12 adapted to engage the wall of a cylinder 13.

The ring assembly also includes a combined expanding and positioning means, indicated generally at 14, which, when two rails are used, holds the rails in axially spaced relation at the respective sides of the groove. As mentioned above, the combined spacer and expander comprises two rows of segments 15, the segments in one row being axially spaced from those in the other row. The segments extend radially outward and are circumferentially spaced from each other, as is apparent in Fig. 4, and the segments in one row are in staggered relation with those in the other row so that the spaces between the segments in one row are likewise in staggered relation with the spaces between the segments in the opposite row.

The segments 15 are connected by a web structure which is circumferentially expansible. To this end the web structure comprises two web members extending from each segment respectively to two segments in the opposite row. In the present instance, the web structure comprises alternate straight web members 20 and offset web members indicated generally at 21 so that each segment has one straight web member and one offset web member connected thereto. Each offset web member comprises a pair of arms 22 which are circumferentially spaced from each other to provide the offset relation and which respectively extend from segments in opposite rows. The two arms 22 of each offset web member 21 are connected at their central portion by a circumferentially extending connector 23. Each offset web member 21 thus has the shape of a letter H, the sides of which are formed by the arms 22 and the cross bar of which is formed by the connector 23, and the end of one side of the H is connected to a segment in one row while the opposite end of the other side of the H is connected to a segment in the opposite row.

Because of the staggered relation of the segments in one row with those in the other row and the circumferential spacing between the segments in each row, the arms 22 of the offset web members 21 are located at the spaces between the segments in each row. The arms 22 at their free ends are of sufficient length to extend axially beyond the respective rows of segments so that they may engage the inner peripheries of the two rails 12. Thus, when the combined spacer and expander 14 tends to expand as when placed in a groove in a piston and the assembly is placed in a cylinder, the arms 22 tend to force the rails outwardly to exert the desired pressure thereof against the cylinder wall 13.

To form a combined spacer and expander as herein disclosed, a strip of sheet metal is utilized and is punched in the manner shown in Fig. 3. Thus, notches 24 are provided, which extend inwardly from opposite edges of the strip in staggered relation to each other. Each notch 24 comprises a wide outer portion to provide the spaces between the segments, and two inwardly extending finger-like portions 25 of different depth. The shorter finger-like portion 25 of a notch in one side of the strip is aligned with the same portion of a notch in the opposite side of the strip to form the cross bar 23 of the H-shape of the offset web member 21, while the longer finger-like portion 25 of each notch is offset from that of the notch opposite and thus form the sides of the H, that is, the arms 22. After the strip is punched in this manner, the segments 15 are bent at right angles to the web structure along the longitudinally extending lines 26 and the strip is given a circular form to cause the segments to extend radially outward. This leaves the arms 22 extending above and below the two rows of segments in a position to engage the respective rails 12.

In Fig. 5, I have shown a piston ring assembly having a combined spacer and expander constructed similarly to that shown in the previously described form but, in the form of Fig. 5, the combined spacer and expander is arranged to exert not only an outward pressure on the rails to cause them to engage the cylinder wall with outward pressure, but also to cause the inner peripheral portions of the rails to bear against the sides of the groove so that their inner peripheral portions will engage such sides in sealing relation therewith. To this end, the outer end portion of each arm 22 is bent inwardly, as indicated at 30, at a slight angle so that the pressure exerted by the combined spacer and expander not only forces the rails 12 outwardly but also causes them to dish so that their inner peripheral portions engage the respective sides of the groove. While, in Fig. 5, both rails are shown in a dished position, either or both of the rails at different points in the engine cycle may lie flat against the sides of the grooves while side pressure at the inner periphery is maintained, the rails in Fig. 5 being shown as they are merely to indicate that there is side pressure at the inner periphery. The angle of the ends 30 of the arms 22 is such that the major pressure is exerted radially outward on the rails and the inner peripheral portions of the rails engaging the sides of the groove with only a relatively light pressure. Such pressure, however, is sufficient to provide a sealing relation therewith so that when a high vacuum condition exists in the cylinder, no oil can be drawn from the inner portion of the groove into the combustion chamber of the cylinder.

From the foregoing description, it will be apparent that I have provided a piston ring assembly having a novel combined expander and positioning means for one or more rails. This means is circumferentially expansible so that it does not have to engage the bottom of the groove in the piston in order to exert an outward force on the rails. Since it is made from a strip of sheet metal which is formed by inexpensive punching and bending operations, the ring assembly can be produced at a low cost. It effectively holds the rail or rails in engagement with the cylinder wall and in the form shown in Fig. 5 it also causes the rails to effect a seal with the sides of the groove.

I claim:

1. A piston ring assembly comprising a pair of axially spaced rails, and combined spacer and expander means for holding the rails in axially spaced relation and for forcing the rails outwardly, said means comprising two rows of segments, and a plurality of web members connecting the segments in one row with those in the other row, each of certain of said web members having a pair of portions extending axially to engage the respective rails, said portions for each of such web members being circumferentially offset from each other.

2. A piston ring assembly comprising a pair of axially spaced rails, and combined spacer and expander means for holding the rails in axially spaced relation and for forcing the rails outwardly, said means comprising two rows of segments, and a plurality of web members connecting the segments in one row with those in the other row, alternate web members each having oppositely extending portions which are circumferentially offset from each other and engage the respective rails.

3. A piston ring assembly comprising a pair of axially spaced rails, and combined spacer and expander means for holding the rails in axially spaced relation and for forcing the rails outwardly, said means comprising two rows of segments, and web structure connecting the two rows of segments and comprising alternate straight and circumferentially offset web members with the offset web members provided with means to engage the rails.

4. A piston ring assembly comprising a pair of axially spaced rails, and combined spacer and expander means for holding the rails in axially spaced relation and for forcing the rails outwardly, said means comprising two rows of segments, and web structure connecting the two rows of segments and comprising alternate straight and circumferentially offset web members, each offset web member having a pair of oppositely extending circumferentially offset portions to engage the respective rails.

5. A piston ring assembly comprising a pair of axially spaced rails, and combined spacer and expander means for holding the rails in axially spaced relation and for forcing the rails outwardly, said means comprising two rows of segments, and web structure comprising alternate straight web members and H-shape web members, each of the latter web members having one end of one side of the H connected to a segment in one row and the other end of the other side connected to a segment in the opposite row, the free ends of the sides engaging the respective rails.

6. A piston ring assembly comprising a pair of axially spaced rails, and combined spacer and expander means for holding the rails in axially spaced relation and for forcing the rails outwardly, said means comprising two rows of segments, the segments in each row being circumferentially spaced from each other, and web members connecting the segments in one row with those in the other row and having portions extending axially beyond the segments at the spaces between the segments and engaging the rails.

7. A piston ring assembly comprising a pair of axially spaced rails, and combined spacer and expander means for holding the rails in axially spaced relation and for forcing the rails outwardly, said means comprising two rows of segments, the segments in one row being in staggered relation with those in the other row and the segments in each row being circumferentially spaced from each other, and web members connecting the segments in one row with those in the other row, each of said web members having a pair of portions extending axially in opposite directions and circumferentially offset from each other and located at spaces between adjacent segments in the opposite rows to engage the rails.

8. A piston ring assembly comprising a pair of axially spaced rails, and combined spacer and expander means for holding the rails in axially spaced relation and for forcing the rails outwardly, said means comprising two rows of segments, each segment being connected to a segment in the opposite row by a web member comprising a pair of arms extending axially in opposite directions from the respective segments and having their free ends engaging the respective rails, and a connecting portion extending between the two arms.

9. A piston ring assembly comprising a pair of axially spaced rails, and combined spacer and expander means for holding the rails in axially spaced relation and for forcing the rails outwardly, said means comprising two rows of segments, each segment being connected to a segment in the opposite row by a web member comprising a pair of circumferentially spaced arms having their free ends engaging the respective rails, and a circumferentially extending connector between the intermediate portions of said arms.

10. A piston ring assembly comprising a pair of axially spaced rails, and combined spacer and expander means for holding the rails in axially spaced relation and for forcing the rails outwardly, said means comprising two rows of segments, and web structure connecting the two rows of segments and including a plurality of web members, each having circumferentially offset portions engaging the respective rails.

11. A piston ring assembly comprising a pair of axially spaced rails, and combined spacer and expander means for holding the rails in axially spaced relation and for forcing the rails outwardly, said means comprising two rows of segments, and web structure connecting the two rows of segments and including a plurality of web members, each having circumferentially offset axial extensions with the free ends of the extensions bent at an angle to the rails to force the rails outwardly and toward the adjacent sides of the groove.

12. A piston ring assembly comprising a pair of axially spaced rails, and combined spacer and expander means for holding the rails in axially spaced relation and for forcing the rails outwardly, said means comprising two rows of segments, each segment being connected to a segment in the opposite row by a web member comprising a pair of arms extending axially in opposite directions, the ends of the arms being bent at an angle and engaging the rails to force them outwardly and toward the adjacent sides of the groove.

13. A piston ring assembly comprising a cylinder engaging rail, and combined expanding and positioning means for holding the rail at one side of the groove, said means including a row of segments for positioning the rail, and web members supporting the segments, certain of said web members having arms extending axially and engaging the rail to force it outwardly.

14. A piston ring assembly comprising a cylinder engaging rail, and combined expanding and positioning means for holding the rail at one side of the groove, said means including a row of segments for positioning the rail at the upper side of the groove, and web members supporting the segments, certain of said web members having arms extending upwardly with their end portions bent at an angle and engaging the rail to force the rail outwardly and against the upper side of the groove.

15. A combined spacer and expander means for use with a pair of rails to form a piston ring assembly, said means comprising two rows of segments, and web structure connecting the two rows of segments and including web members, each having circumferentially offset portions adapted to engage the inner peripheries of the respective rails.

16. A combined spacer and expander means for use with a pair of rails to form a piston ring assembly, said means comprising two rows of segments, and web structure connecting the two rows of segments and comprising alternate straight and circumferentially offset web members, each of the latter having circumferentially offset portions adapted to engage the inner peripheries of the respective rails.

17. A combined spacer and expander means for use with a pair of rails to form a piston ring assembly, said means comprising two rows of segments, and web structure connecting the two rows of segments and including web members, each comprising a pair of arms extending axially and oppositely from segments in the opposite rows and adapted to engage the respective rails, and means connecting the arms.

References Cited in the file of this patent

UNITED STATES PATENTS

| | | |
|---|---|---|
| 2,111,258 | Zahodiakin | Mar. 15, 1938 |
| 2,220,948 | Paton | Nov. 12, 1940 |
| 2,635,022 | Shirk | Apr. 14, 1953 |
| 2,695,825 | Estey | Nov. 30, 1954 |